(12) United States Patent
Shawver et al.

(10) Patent No.: US 7,502,745 B1
(45) Date of Patent: Mar. 10, 2009

(54) INTERFACES TO A JOB MANAGER IN DISTRIBUTED COMPUTING ENVIRONMENTS

(75) Inventors: Matthew A. Shawver, Kaneohe, HI (US); Loren Dean, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 10/940,151

(22) Filed: Sep. 13, 2004

Related U.S. Application Data

(63) Continuation-in-part of application No. 10/896,784, filed on Jul. 21, 2004.

(51) Int. Cl.
*G06Q 10/00* (2006.01)

(52) U.S. Cl. .......................... 705/1; 719/313

(58) Field of Classification Search ................ 719/313; 718/104–105; 705/1
See application file for complete search history.

(56) References Cited

U.S. PATENT DOCUMENTS

| | | | | |
|---|---|---|---|---|
| 5,481,698 A | * | 1/1996 | Itoh et al. ...................... 714/48 |
| 5,612,957 A | * | 3/1997 | Gregerson et al. ........... 370/401 |
| 5,748,930 A | * | 5/1998 | Prakash ...................... 715/751 |
| 5,784,884 A | * | 7/1998 | Poerio et al. ................... 60/403 |
| 5,838,968 A | * | 11/1998 | Culbert ........................ 718/104 |
| 5,893,128 A | * | 4/1999 | Nauckhoff ................... 715/511 |
| 5,926,775 A | * | 7/1999 | Brumley et al. .............. 702/127 |
| 5,950,201 A | * | 9/1999 | Van Huben et al. ............ 707/10 |
| 6,003,065 A | * | 12/1999 | Yan et al. ..................... 709/201 |
| 6,006,230 A | * | 12/1999 | Ludwig et al. ................. 707/10 |
| 6,058,426 A | * | 5/2000 | Godwin et al. .............. 709/229 |
| 6,112,243 A | * | 8/2000 | Downs et al. ................ 709/226 |
| 6,115,642 A | * | 9/2000 | Brown et al. ................. 700/104 |
| 6,249,836 B1 | * | 6/2001 | Downs et al. ................ 710/268 |
| 6,463,457 B1 | * | 10/2002 | Armentrout et al. ......... 709/201 |
| 6,950,874 B2 | * | 9/2005 | Chang et al. ................. 709/229 |
| 2002/0004853 A1 | * | 1/2002 | Jones et al. .................. 709/328 |
| 2002/0019844 A1 | * | 2/2002 | Kurowski et al. ........... 709/201 |
| 2002/0087382 A1 | * | 7/2002 | Tiburcio ......................... 705/9 |
| 2003/0084010 A1 | * | 5/2003 | Bigus et al. ..................... 706/6 |
| 2003/0154284 A1 | * | 8/2003 | Bernardin et al. ........... 709/226 |
| 2004/0153545 A1 | * | 8/2004 | Pandya et al. ............... 709/226 |
| 2005/0052664 A1 | * | 3/2005 | Ferlitsch ..................... 358/1.6 |

OTHER PUBLICATIONS www.mathworks.com; retrieved from wayback machine any linkage, Oct. 2002.*

(Continued)

*Primary Examiner*—John G Weiss
*Assistant Examiner*—Traci L Casler
(74) *Attorney, Agent, or Firm*—Lahive & Cockfield, LLP; Kevin J. Canning

(57) ABSTRACT

A method, system and computer program product is disclosed for a distributed system with which an arbitrary job manager is able to be interfaced. In the distributed system, a job may be created by a host or client and submitted to the arbitrary job manager for distributing the job to one or more remote workers. The present invention provides interfaces with the arbitrary job manager to establish communication channels to the arbitrary job manager. As such, the present invention allows the use of an arbitrary job manager in the distributed system.

24 Claims, 5 Drawing Sheets

OTHER PUBLICATIONS www.mathworks.com; retrieved from wayback machine any linkage, Oct. 2002 Ref. A.*

Linda User's Guide and Reference Manual; May 2000; 163 pgs.; Scientific Computing Associates, New Haven CT; US.

Husbands, Parry Jones Reginald, "Interactive Supercomputing," pp. 1-96 (1999).

The Mathworks, "MATLAB, The Language of Technical Computing, External Interfaces, Version 6," *The Mathworks, Inc.*, (2002).

The Mathworks, "MATLAB, The Language of Technical Computing, Creating Graphical User Interfaces, Version 6," *The Mathworks, Inc.*, (2002).

The Mathworks, "MATLAB, The Language of Technical Computing, External Interfaces Reference, Version 6," *The Mathworks, Inc.*, (2002).

The Mathworks, "MATLAB, The Language of Technical Computing, Getting Started with MATLAB, Version 6," *The Mathworks, Inc.*, (2002).

The Mathworks, "MATLAB, The Language of Technical Computing, Using MATLAB Graphics, Version 6," *The Mathworks, Inc.*, (2002).

The Mathworks, "MATLAB Excel Builder, The Language of Technical Computing, User's Guide, Version 1," *The Mathworks, Inc.*, (2002).

The Mathworks, "MATLAB Excel Builder 1.1 Release Notes," *The Mathworks, Inc.*, (2002).

The Mathworks, "Data Acquisition Toolbox Adaptor Kit, For Use with MATLAB, User's Guide, Version 2," *The Mathworks, Inc.*, (2002).

The Mathworks, "Data Acquisition Toolbox Quick Reference Guide," *The Mathworks, Inc.*, (2002).

The Mathworks, "Data Acquisition Toolbox, For Use with MATLAB," User's Guide Version 2, *The Mathworks, Inc.*, (2002).

The Mathworks, "MATLAB Link for Code Composer Studio Development Tools, User's Guide Version 1," *The Mathworks, Inc.*, (2002).

The Mathworks, "MATLAB Link for Code Composer Studio Development Tools Release Notes," *The Mathworks, Inc.*, (2002).

The Mathworks, "MATLAB COM Builder, The Language of Technical Computing, User's Guide Version 1," *The Mathworks, Inc.*, (2002).

The Mathworks, "MATLAB COM Builder Release Notes," *The Mathworks, Inc.*, (2002).

The Mathworks, "Communications Toolbox, For Use with MATLAB, User's Guide Version 2," *The Mathworks, Inc.*, (2002).

The Mathworks, "Communications Toolbox 2.1 Release Notes," *The Mathworks, Inc.*, (2002).

The Mathworks, "Simulink, Model-Based and System-Based Design, Writing S-Functions Version 5," *The Mathworks, Inc.*, (2002).

The Mathworks, "Simulink 5.0 Release Notes," *The Mathworks, Inc.*, (2002).

The Mathworks, "Simulink, Model-Based and System-Based Design, Using Simulink Version 5," *The Mathworks, Inc.*, Version 5 (2002).

The Mathworks, "Simulink, Model-Based and System-Based Design, Simulink Reference Version 5," *The Mathworks, Inc.*, Version 5 (2002).

The Mathworks, "Simulink Performance Tools 1, for enhancing design productivity for your Simulink models," www.mathworks.com.

The Mathworks, "Simulink Performance Tools 1, Manage and optimize the performance of large Simulink models," www.mathworks.com.

The Mathworks, "Simulink Performance Tools 1, Measure test completeness, accelerate and optimize model performance," www.mathworks.com.

The Mathworks, "Simulink Performance Tools Release Notes," *The Mathworks, Inc.*, (2002).

The Mathworks, "Stateflow and Stateflow Coder, For Complex Logic and State Diagram Modeling, User's Guide Version 5," *The Mathworks, Inc.*, (2002).

The Mathworks, "Stateflow and Stateflow Coder Release Notes," The Mathworks, Inc., (2002).

The Mathworks, "MATLAB, The Language of Technical Computing, Installation Guide for Windows, Release 13 (MATLAB 6.5 Product Family," *The Mathworks, Inc.*, (2002).

The Mathworks, "MATLAB, The Language of Technical Computing, Installation Guide for UNIX, Release 13 (MATLAB 6.5 Product Family," *The Mathworks, Inc.*, (2002).

The Mathworks, "MATLAB, The Language of Technical Computing, Installing and Using MATLAB on Mac OS X, Release 13 (MATLAB 6.5 Product Family," *The Mathworks, Inc.*, (2002).

The Mathworks, "MATLAB, The Language of Technical Computing, MAT-File Format Version 5," *The Mathworks, Inc.*, (2002).

The Mathworks, "MATLAB, The Language of Technical Computing, Release 11 New Features," *The Mathworks, Inc.*, (1999).

The Mathworks, "MATLAB, The Language of Technical Computing, Release 11.1 New Features," *The Mathworks, Inc.*, (1999).

The Mathworks, "MATLAB, The Language of Technical Computing, MATLAB Programming Tips Version 6," *The Mathworks, Inc.*, (2002).

The Mathworks, "MATLAB, The Language of Technical Computing, MATLAB Function Reference vol. 1: A-E Version 6," *The Mathworks, Inc.*, (2002).

The Mathworks, "MATLAB, The Language of Technical Computing, MATLAB Function Reference vol. 2: F-O Version 6," *The Mathworks, Inc.*, (2002).

The Mathworks, "MATLAB, The Language of Technical Computing, MATLAB Function Reference vol. 3: P-Z Version 6," *The Mathworks, Inc.*, (2002).

The Mathworks, "MATLAB, The Language of Technical Computing, Release Notes for Release 13," *The Mathworks, Inc.*, (2002).

The Mathworks, "MATLAB, The Language of Technical Computing, MATLAB 6.5 Release Notes," *The Mathworks, Inc.*, (2002).

AU01—MATLAB For Automotive Data Analysis.

The Mathworks, Inc., "The Optimization Toolbox 2.0 for use with MATLAB,".

The Mathworks, "Optimization Toolbox, For Use with MATLAB, User's Guide Version 2," *The Mathworks, Inc.*, (2001).

The Mathworks, "Optimization Toolbox 2.2 Release Notes," *The Mathworks, Inc.*, (2001).

The Mathworks, "SimMechanics, For Use with Simulink, User's Guide Version 1," *The Mathworks, Inc.*, (2002).

The Mathworks, "SimMechanics Release Notes," *The Mathworks, Inc.*, (2002).

The Mathworks, "MATLAB, The Language of Technical Computing, Using MATLAB Version 6," *The Mathworks, Inc.*, (2002).

* cited by examiner

INTERFACES TO A JOB MANAGER IN DISTRIBUTED COMPUTING ENVIRONMENTS

RELATED APPLICATION

This application is a continuation-in-part of pending United States patent application entitled "METHODS AND SYSTEM FOR DISTRIBUTING TECHNICAL COMPUTING TASKS TO TECHNICAL COMPUTING WORKERS" (U.S. patent application Ser. No. 10/896,784) filed on Jul. 21, 2004.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention generally relates to distributed computing environments and more particularly to systems, methods and computer program products for enabling an arbitrary job manager to interface with the distributed computing environments.

BACKGROUND INFORMATION

MATLAB® is a product of The MathWorks, Inc. of Natick, Mass., which provides engineers, scientists, mathematicians, and educators across a diverse range of industries with an environment for technical computing applications. MATLAB® is an intuitive high performance language and technical computing environment that provides mathematical and graphical tools for mathematical computation, data analysis, visualization and algorithm development. MATLAB® integrates numerical analysis, matrix computation, signal processing, and graphics in an easy-to-use environment where problems and solutions are expressed in familiar mathematical notation, without traditional programming. MATLAB® is used to solve complex engineering and scientific problems by developing mathematical models that simulate the problem. A model is prototyped, tested and analyzed by running the model under multiple boundary conditions, data parameters, or just a number of initial guesses. In MATLAB®, one can easily modify the model, plot a new variable or reformulate the problem in a rapid interactive fashion that is typically not feasible in a non-interpreted programming such as Fortran or C.

As a desktop application, MATLAB® allows scientists and engineers to interactively perform complex analysis and modeling in their familiar workstation environment. However, a single workstation can be limiting to the size of the problem that can be solved, because of the relationship of the computing power of the workstation to the computing power necessary to execute computing intensive iterative processing of complex problems in a reasonable time. For example, a simulation of a large complex aircraft model may take a reasonable time to run with a single computation with a specified set of parameters. However, the analysis of the problem may also require the model be computed multiple times with a different set of parameters, e.g., at one-hundred different altitude levels and fifty different aircraft weights, to understand the behavior of the model under varied conditions. This would require five-thousand computations to analyze the problem as desired and the single computer would take an unreasonable or undesirable amount of time to perform these simulations. In this case, the single computer would be allocated full-time to performing the computation while many computer resources on the network may be idle. Additionally, the benefit of the interactive features of the software is reduced as the computation time increases.

With many engineering and scientific problems requiring larger and more complex modeling, computations accordingly become more resource intensive and time-consuming. When a computation becomes so large and complex that it cannot be completed in a reasonable amount of time on a single computer, a solution to decrease the computation time is needed. As a solution, distributed computing systems have been provided to deal with a large and complex engineering and scientific computation.

In the distributed computing systems, a job manager may be employed to distribute a given computation to remote computing entities so that the remote computing entities are able to perform the distributed computation. However, the job manager may be provided by various vendors and may be unique in many respects. Therefore, it is needed for the distributed computing systems to interface with an arbitrary job manager provided by an arbitrary vendor (i.e., any one of a number of different job managers).

SUMMARY OF THE INVENTION

The present invention provides a distributed system with which an arbitrary job manager is able to be interfaced. In the distributed system, a job may be created by a host or client and submitted to the arbitrary job manager for distributing the job to one or more remote workers. The present invention provides interfaces with the arbitrary job manager to establish communication channels to the arbitrary job manager. The interfaces with the arbitrary job manager may establish communication channels between the host or client and the arbitrary job manager so that the host or client is able to submit the job to the arbitrary job manager through the communication channels. The interfaces with the arbitrary job manager may also establish communication channels between the arbitrary job manager and the remote workers so that the arbitrary job manager is able to distribute the job to the remote workers through the communication channels. The remote workers may return the results of executing the job to the arbitrary job manager through the communication channels, which, in turn, forwards the results to the host or client through the communication channels. As such, the present invention allows the use of an arbitrary job manager in the distributed system.

In one aspect, a distributed system includes a client for creating tasks. The system also includes an arbitrary job manager for receiving the tasks from the client. The system further includes an interface for establishing a communication channel between the client and the arbitrary job manager so that the client submits the tasks to the arbitrary job manager through the communication channel.

In another aspect, a distributed system includes a worker for computing tasks. The system also includes an arbitrary job manager for distributing tasks to the worker. The system further includes an interface for establishing a communication channel between the arbitrary job manager and the worker so that the arbitrary job manager distributes the tasks to the worker through the communication channel.

In another aspect, a method and a computer program are provided for a client to interface with an arbitrary job manager. The method includes the step of defining tasks in the client. The method also includes the step of establishing a communication channel between the client and the arbitrary job manager. The method further includes the step of submitting the tasks to the arbitrary job manager through the communication channel.

In another aspect, a method and a computer program product are provided for a worker to interface with an arbitrary job manager. The method includes the step of establishing a communication channel between the arbitrary job manager and the worker. The method also includes the step of receiving one or more tasks from the arbitrary job manager through the communication channel.

The details of various embodiments of the invention are set forth in the accompanying drawings and the description below. Other features and advantages of the invention will become apparent from the description, the drawings and the claims.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION

Figure 1:
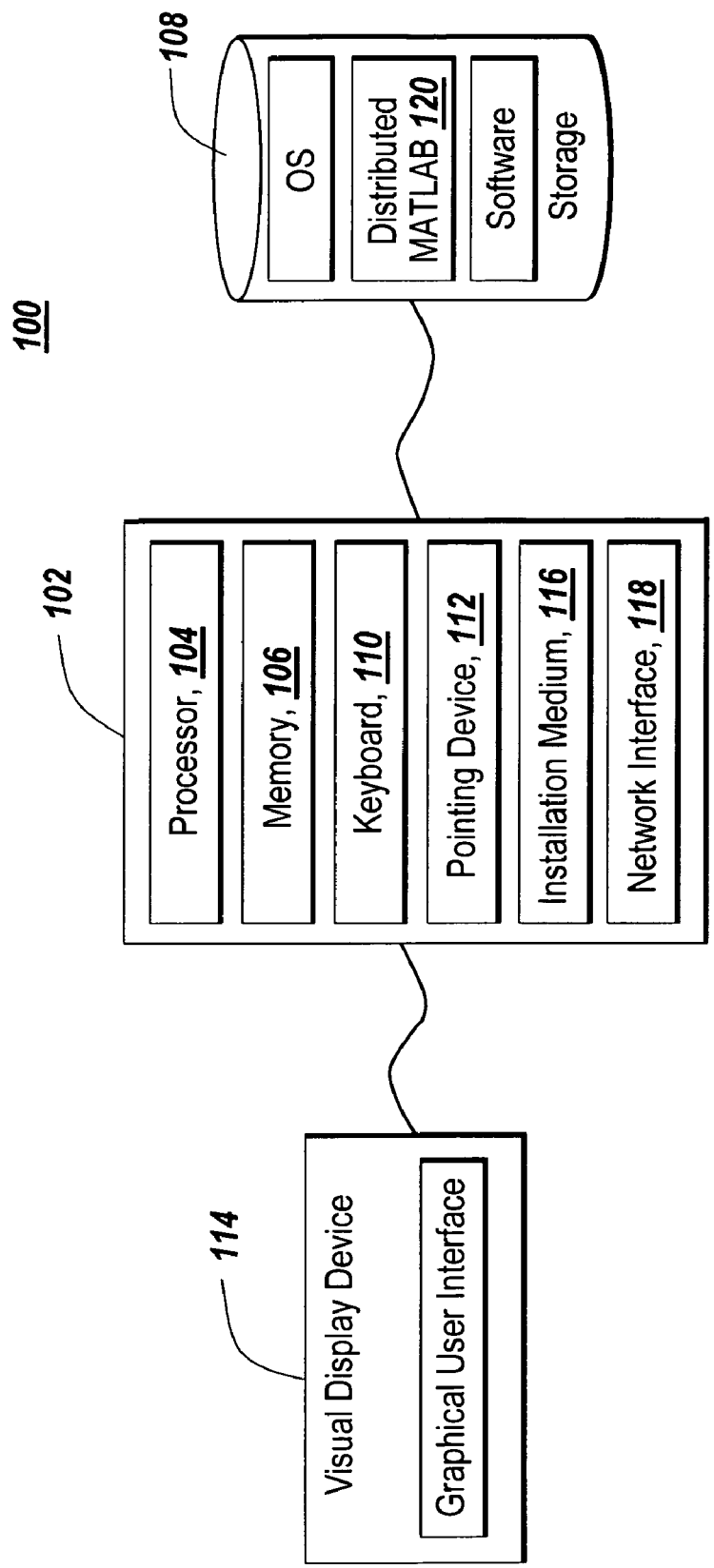
FIG. 1 is a block diagram of a computing device for practicing the illustrative embodiment of the present invention.

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The illustrative embodiment of the present invention provides a distributed computing environment with which an arbitrary job manager is able to be interfaced. The distributed computing environment includes interfaces for working with job managers from a variety of vendors and is able to work properly regardless of the job manager that is employed. The illustrative embodiment provides an architecture that abstracts away the unique dependencies of the job managers and facilitates the addition of new types of job managers. The job managers are "pluggable" into the environment.

In the distributed computing system of the illustrative embodiment, tasks can be declared on a technical computing client and additionally organized into jobs. A job is a logical unit of activities, or tasks that are processed and/or managed collectively. A task defines a technical computing command, such as a MATLAB® command, to be executed, and the number of arguments and any input data to the arguments. A job is a group of one or more tasks. The technical computing tasks may be submitted to an arbitrary job manager for distributing the tasks to remote technical computing workers for execution of the tasks on multiple computers systems. A technical computing worker performs technical computing on a task and may return a result to the arbitrary job manager, which, in turn, forwards the result to the technical computing client.

The illustrative embodiment of the present invention provides interfaces with the arbitrary job manager in the distributed computing system. The interfaces establish communication channels with the arbitrary job manager. The interfaces may establish communication channels between the technical computing client and the arbitrary job manager so that the technical computing client is able to submit the job to the arbitrary job manager through the communication channels. The interfaces may also establish communication channels between the arbitrary job manager and the remote technical computing worker so that the arbitrary job manager distributes the tasks to the remote technical computing worker through the communication channels. The technical computing worker may return the result to the arbitrary job manager through the communication channels established between the arbitrary job manager and the remote technical computing worker, and the arbitrary job manager may forwards the result to the technical computing client through the communication channels between the technical computing client and the arbitrary job manager.

The illustrative embodiment of the present invention establishes the communication channels independent of the vender of the arbitrary job manager and the "interface protocol" or "interface format" of the arbitrary job manager. The "interface protocol" or "interface format" refers to a set of rules for transmitting data to and receiving data from the arbitrary job manager. The set of rules is capable of defining a data format for transferring data to or receiving data from an arbitrary job manager and is further capable of defining at least a type of error checking, if any, to be used for data transmissions; a data compression method, if any; how the sending mechanism will indicate that it has finished sending data; how the arbitrary job manager will indicate that it has received data.

The illustrative embodiment will be described solely for illustrative purposes relative to a distributed MATLAB® technical computing environment. Although the illustrative embodiment will be described relative to a distributed MATLAB®-based application, one of ordinary skill in the art will appreciate that the present invention may be applied to distributing the processing of technical computing tasks with other technical computing environments, such as technical computing environments using software products of LabVIEW® or MATRIXx from National Instruments, Inc., or Mathematica® from Wolfram Research, Inc., or Mathcad of Mathsoft Engineering & Education Inc., or Maple™ from Maplesoft, a division of Waterloo Maple Inc.

FIG. 1 depicts an exemplary device 100 for practicing the illustrative embodiment of the present invention. The device 100 may be any computer system such as a workstation, desktop computer, server, laptop, handheld computer or other form of computing or telecommunications device that is capable of communication and that has sufficient processor power and memory capacity to perform the operations described herein. One of ordinary skill in the art will appreciate that the device 100 is not limited to an electronic device and may take other forms, including a quantum computer, optical computer and bio computer.

The device 100 may include a computing device 102 having memory 106, on which software according to one embodiment of the present invention may be stored, a processor (CPU) 104 for executing software stored in the memory 106, and other programs for controlling system hardware. The memory 106 may include a computer system memory or random access memory such as DRAM, SRAM, EDO RAM, etc. The memory 106 may include other types of memory as well, or combinations thereof. A human user may interact with the computing device 102 through a visual display device 114 such as a computer monitor, which may include a graphical user interface (GUI). The computing device 102 may include other I/O devices such as a keyboard 110 and a pointing device 112, for example a mouse, for receiving input from a user. Optionally, the keyboard 110 and the pointing device 112 may be connected to the visual display device 114. The computing device 102 may include other suitable conventional I/O peripherals. The computing device 102 may support any suitable installation medium 116, a CD-ROM, floppy disks, tape device, USB device, hard-drive or any other device suitable for installing software programs such as Distributed MATLAB® 120. The computing device 102 may further include a storage device 108, such as a hard-drive or CD-ROM, for storing an operating system and other related software, and for storing application software programs such as Distributed MATLAB® 120 of the present invention. Additionally, the operating system and Distributed MATLAB® 120 of the present invention can be run from a bootable CD, such as, for example, KNOPPIX®, a bootable CD for GNU/Linux.

The computing device 102 can be running any operating system such as any of the versions of the Microsoft® Windows operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. Furthermore, the software components of Distributed MATLAB® 120 can be capable of and configured to operate on the operating system that may be running on any computing devices. Additionally, the software components of Distributed MATLAB® 120 can also be capable of and configured to operate on and take advantage of different processors of any computing devices. For example, Distributed MATLAB® can run on a 32 bit processor of one computing device and a 64 bit processor of another computing device.

The computing device 102 may include a network interface 118 to interface to a Local Area Network (LAN), Wide Area Network (WAN), or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. Those of skill in the art will appreciate that the network interface 118 may include a bus interface to, for example, Myrinet, Peripheral Component Interconnect (PCI), PCI extended (PCI-X), etc. The network interface 118 may include a built-in network adaptor, network interface card, PCMCIA network card, card bus network adaptor, wireless network adaptor, USB network adaptor, modem or any other device suitable for interfacing the computing device 102 to any type of network capable of communication and performing the operations described herein.

Figure 2:
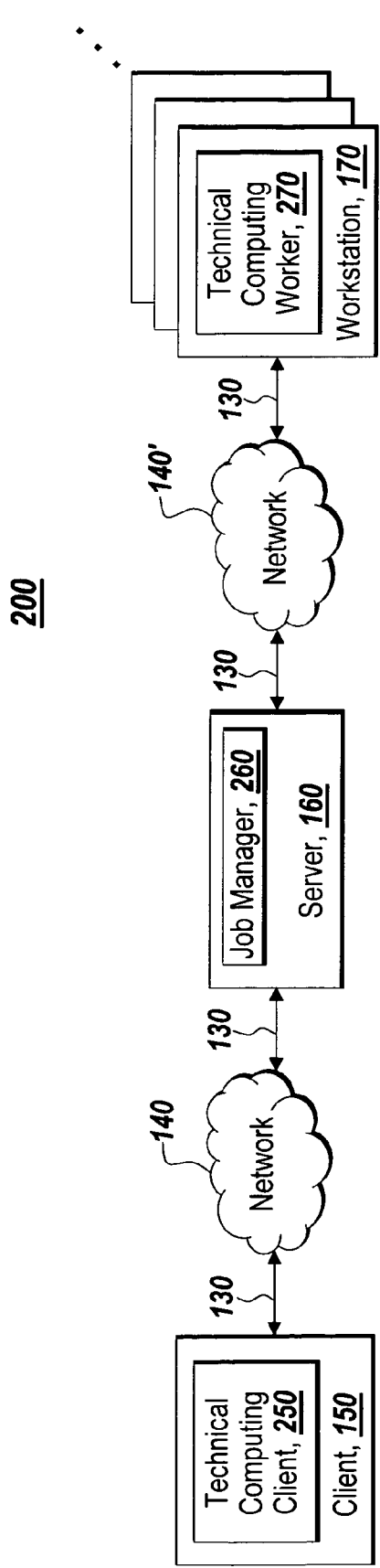
FIG. 2 is a block diagram of a distributed computing system for practicing the illustrative embodiment of the present invention.

FIG. 2 shows an illustrative embodiment of a multi-tier distributed computing system. The multi-tier distributed computing system 200 includes a technical computing client 250 running on a client computer 150 in communications over a network communication channel 130 to a server 160 on a network 140. The server 160 includes an arbitrary job manager 260. The job manager 260 communicates over a network communication channel 130 on the network 140' to the technical computing worker 270 on the workstation 170. The distributed computing system 200 allows the technical computing client 250 to use the computing resources that may be available from a technical computing worker 270 on the workstation 170 to perform technical computing of tasks. This frees up the technical computing client 250 to perform other tasks, or the client computer 150 to execute other software applications. The technical computing worker 270 may be available on an as needed basis to the technical computing client 250. When not performing technical computing of tasks from the technical computing client 250, the workstation 170 of the technical computing worker 270 can be executing other software programs, or the technical computing worker 270 can perform technical computing of tasks from other technical computing clients.

Multiple technical computing workers may be hosted on a plurality of workstations. The job manager may be in communication through the network communication channel 130 on the network 140' with one, some or all of the technical computing workers. As such, the job manager 260 can distribute tasks to multiple technical computing workers to scale the distributed system and increase computation time of tasks. The technical computing workers can be hosted on the same workstation, or a single technical computing worker can have a dedicated workstation. Alternatively, one or more of the technical computing workers can be hosted on either the client 150 or the server 160.

The technical computing client 250 can be a technical computing software application that provides a technical computing and graphical modeling environment for generating block diagram models and to define mathematical algorithms for simulating models. The technical computing client 250 can be a Distributed MATLAB® client, which may include all or a portion of the functionality provided by the standalone desktop application of MATLAB®. Additionally, the technical computing client 250 can be any of the software programs available in the MATLAB® product family. Furthermore, the technical computing client 250 can be a custom software program or other software that accesses Distributed MATLAB® functionality via an interface, such as an application programming interface, or by other means. One ordinarily skilled in the art will appreciate the various combinations of client types that may access the functionality of the system.

With an application programming interface and/or programming language of the technical computing client 250, functions can be defined representing a technical computing task to be executed by either a technical computing environment local to the client computer 150, or remote on the workstation 170. The local technical computing environment may be part of the technical computing client 250, or a technical computing worker running on the client computer 150. The programming language includes mechanisms to define a task to be distributed to a technical computing environment and to communicate the task to the technical computing worker 270 on the workstation 170, or alternatively, on the client 150. For example, the technical computing client 250 may declare a function to generate a random set of ten numbers and further delegate that the technical computing worker 270 running on the workstation 170 execute the function. Also, the application programming interface and programming language of the Distributed MATLAB® client 250 includes mechanisms to receive a result from the execution of technical computing of the task from another technical computing environment. For example, the technical computing client 250 may declare a variable to hold a result returned from the technical computing worker 270 performing technical computing of the random generation function.

The technical computing worker 270 of the system 200 can be a technical computing software application that provides a technical computing environment for performing technical computing of tasks, such as those tasks defined or created by the technical computing client 250. The technical computing worker 270 can be a Distributed MATLAB® worker application, module, service, software component, or a session, which includes support for technical computing of functions defined in the programming language of MATLAB®. A session is an instance of a running technical computing worker 270 by which a technical computing client can connect and access its functionality. The technical computing worker 270 can include all the functionality and software components of the technical computing client 250, or it can just include those software components it may need to perform technical computing of tasks it receives for execution. The technical computing worker 270 may be configured to and capable of running any of the modules, libraries or software components of the MATLAB® product family. As such, the technical computing worker 270 may have all or a portion of the software components of MATLAB® installed on the workstation 170, or alternatively, accessible on another system in the network 140. The technical computing worker 270 has mechanisms to receive a task distributed from the technical computing client 250. The technical computing worker 270 is capable of performing technical computing of the task as if the technical computing client 250 was performing the technical computing in its own technical computing environment. The technical computing worker 270 also has mechanisms, to return a result generated by the technical computing of the task to the technical computing client 250.

The illustrative embodiment of the present invention may provide for dynamic licensing of software components or products in the distributed system 200. A job may be generated by the computing client 250 and include one or more function calls provided in different software components or products. The job may include a plurality of tasks that are distributed to workers 270 for a distributed execution of the job. When the tasks are distributed to the workers 270, information on the software components or products for which the computing client 250 is licensed is also distributed with the tasks. The workers 270 receive the tasks with the information on the software components or products and dynamically provide licenses for the software components or products based on the information. The workers 270 execute the tasks using the dynamically provided licenses for the software components or products. The results from the execution of the tasks are returned to the computing client 250.

The job manager 260 is an arbitrary job manager provided by any of a number of vendors. The arbitrary job manager 260 may include or be associated with an automatic task distribution mechanism for the automatic distribution of tasks from the technical computing client 250 to the technical computing worker 270. The automatic task distribution mechanism may allow the technical computing client 250 to delegate the management of task distribution to the automatic task distribution mechanism. For example, a task can be defined and submitted to the arbitrary job manager 260 without specifying which technical computing worker 270 is to perform the technical computing of the task. The technical computing client 250 does not need to know the specifics of the technical computing worker 270. The technical computing client can define a function to submit the task to the arbitrary job manager 260, and get a result of the task from the arbitrary job manager 260. As such, the arbitrary job manager 260 provides a level of indirection between the technical computing client 250 and the technical computing worker 270.

This eases the distributed programming and integration burden on the technical computing client 250. The technical computing client 250 does not need to have prior knowledge of the availability of the technical computing worker 270. For multiple task submissions from the technical computing client 250, the arbitrary job manager 260 can manage and handle the delegations of the tasks to the same technical computing worker 270, or to other technical computing workers, and hold the results of the tasks on behalf of the technical computing client 250 for retrieval after the completion of technical computing of all the distributed tasks.

Figure 3:
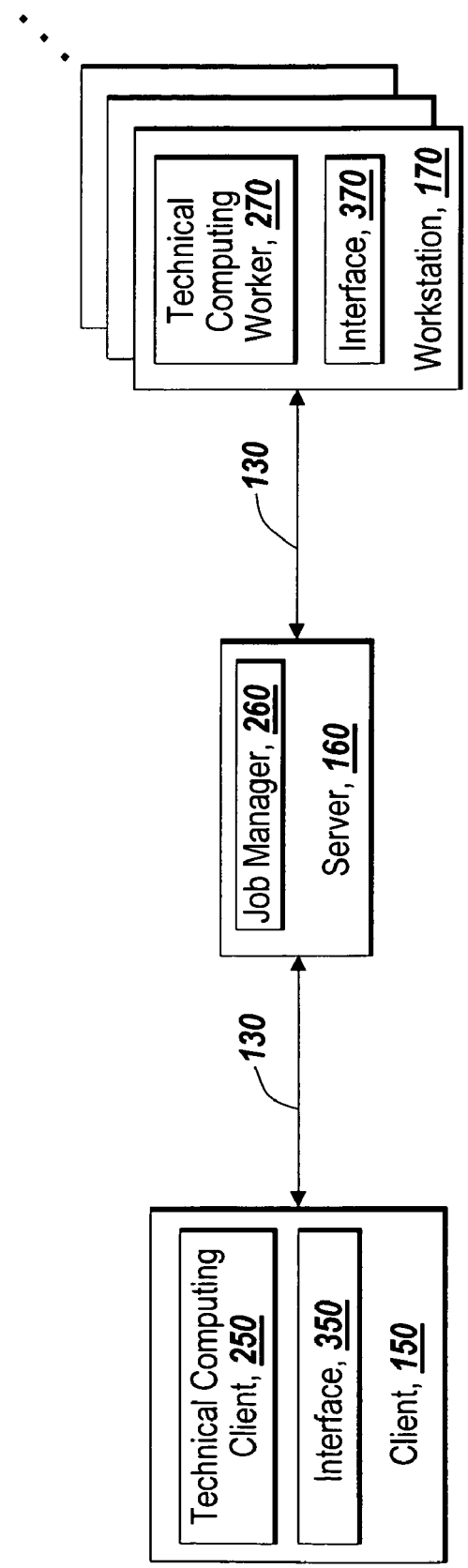
FIG. 3 is a block diagram showing the interfaces of a distributed computing system to an arbitrary job manager.

FIG. 3 is a block diagram showing the interfaces to an arbitrary job manager in the illustrative embodiment of the present invention. The technical computing client 150 includes an interface 350 that enables the arbitrary job manager 260 in the server 160 to interface with the technical computing client 250 in the client 150. The interface 350 establishes the communication channel 130 between the technical computing client 250 and the arbitrary job manager 260 so that the technical computing client 250 is able to submit the job to the arbitrary job manager through the communication channel 130. In addition, the technical computing client 150 also receives a result from the execution of the job through the communication channel 130 established by the interface 350 between the technical computing client 250 and the arbitrary job manager 260. One of ordinary skill in the art will appreciate that the interface 350 may be provided in the technical computing client 250 or in the network interface 180.

The technical computing worker 170 includes an interface 370 that enables the arbitrary job manager 260 in the server 160 to interface with the technical computing worker 270 in the workstation 170. The interface 370 establishes the communication channel 130 between the arbitrary job manager 260 and the technical computing worker 270 so that the arbitrary job manager 260 is able to distribute tasks in the job to the technical computing worker 250 through the communication channel 130. In addition, the arbitrary job manager may also receive the result from the execution of the tasks through the communication channel 130 between the arbitrary job manager 260 and the technical computing worker 270. One of ordinary skill in the art will appreciate that the interface 370 may be provided in the technical computing worker 270 or in the network interface 180.

The interfaces 350 and 370 establish the communication channel 130 independent of the vender of the arbitrary job manager and the interface protocol of the arbitrary job manager. The interfaces of the present invention are able to establish communication channels with an arbitrary job manager supplied from various venders and independent of an "interface protocol" or "interface format" of the arbitrary job manager. The "interface protocol" or "interface format" refers to a set of rules for transmitting data and receiving data from the arbitrary job manager. The set of rules is capable of defining a data format for transferring data to or receiving data from an arbitrary job manager and is further capable of defining at least a type of error checking, if any, to be used for data transmissions; a data compression method, if any; how the sending mechanism will indicate that it has finished sending data; how the arbitrary job manager will indicate that it has received data.

Figure 4:
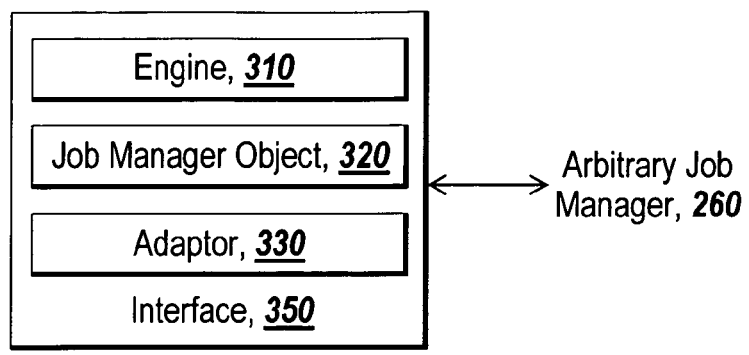
FIG. 4 is a block diagram showing the details of the interfaces of the distributed computing system depicted in FIG. 3.

FIG. 4 is a block diagram showing an exemplary interface in the illustrative embodiment. One of skill in the art will appreciate that FIG. 4 depicts an exemplary interface 350 of the technical computing client 250 in the client computer 150, and the interface 370 of the technical computing worker 270 in the workstation 170 may be implemented in a similar manner. The interface 350 may include an interface engine 310, a job manager object 320, and an adaptor 330. In the description below, the interface engine 310, the job manager object 320, and adaptor 330 are discussed as distinct entities, nonetheless those skilled in the art will appreciate that two or more of them may be implemented as a single entity.

The interface engine 310 is responsible for managing data transfers between the technical computing client 250 and the arbitrary job manager 260. The interface engine 310 is further responsible for formatting the data into a format understandable by the technical computing client 250 or the arbitrary job manager 260. The interface engine 310 can interface with a job manager object 320 to determine a communication protocol defining how the data is transferred between the arbitrary job manager 260 and the technical computing client 250. The interface engine 310 communicates to the adaptor 330 in order to allow the interface engine 310 to communicate with the arbitrary job manager 260. The interface 350 is capable of including more than one adaptor 330 for interfacing with different arbitrary job managers 260. As such, it is possible to have an adaptor 330 for each job manager 260. The adaptor 330 assists in creating an abstraction of information specific to the arbitrary job manager 260. The abstracted data is used by the interface 350 to create one or more objects, such as a job manager object 320, which will be described below in more detail with regard to FIG. 5.

The interface 350 using the interface engine 310 and the adaptor 330 establishes and provides a communication channel 130 between the technical computing client 250 and the arbitrary job manager 260. Thus, the communication channel 130 operates in a manner independent of an interface type and protocol and the vendor of the arbitrary job manager thus allowing the technical computing client 250 to interface with and interact with the arbitrary job manager 260 using a set of functions, methods and controls.

Figure 5:
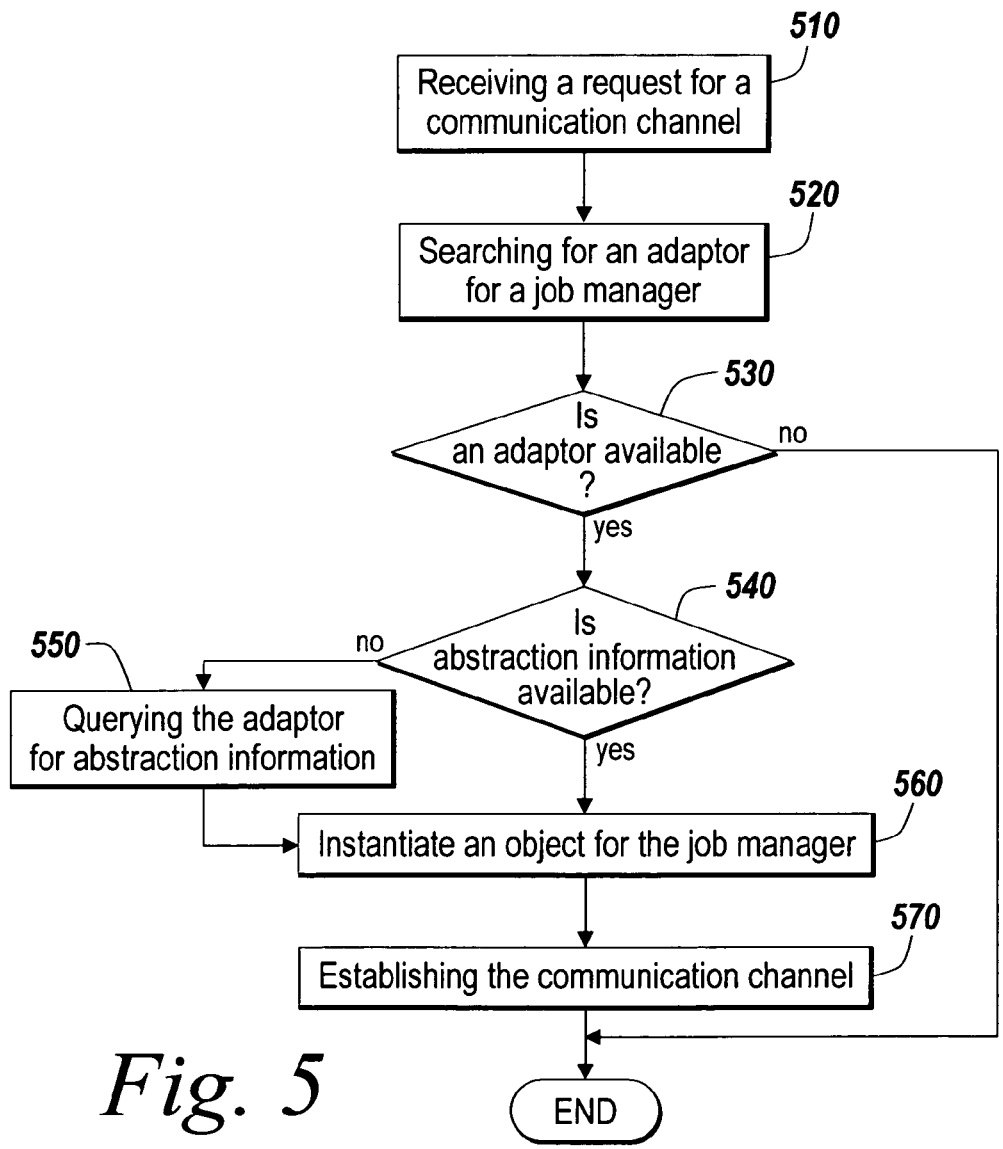
FIG. 5 is a flow chart illustrating an exemplary operation of the interfaces in the distributed computing system depicted in FIGS. 3 and 4.

FIG. 5 illustrates an exemplary operation of the interface 350 depicted in FIG. 4. One of skill in the art will appreciate that the exemplary operation described relative to the interface 350 may also apply to the operation of the interface 370 of the technical computing worker 270 in the workstation 170. The interface 350 may receive a request for a communication channel between the technical computing client 250 and the arbitrary job manager 260 (step 510). The interface engine 310 searches a directory, or other suitable data structure such as a file or look up table for an available adaptor 330 suitable for the arbitrary job manager 260 (step 520). The search for available adaptors can be performed once when the request for the communication channel is received, the results of which can be stored in a storage device or in a suitable storage medium. Nevertheless, the interface 350 is adaptable so that each time the request is received a new search is performed for available adaptors in the event that a new adaptor is plugged in. For the purpose of the discussion of the illustrative embodiment of the present invention, information on available adaptors is stored after an initial search. The interface engine 310 can initialize all available adaptors or initialize a selected one or more adaptors suitable for use with the arbitrary job manager 260. Each initialized adaptor 330 provides some form of an indication, such as a Boolean return value, to the interface engine 310 to indicate completion or failure of initialization. The interface engine 310 upon receipt of all values from the initialized adaptors returns a list of available adaptors that were successfully initiated to the technical computing client 250.

If the adaptor 330 is available for the arbitrary job manager 260 (step 530) then it is determined if the adaptor 330 has already abstracted information concerning the arbitrary job manager 260 and if that information is available, for example, is there a file, a class definition, or object that contains the abstracted information (step 540). If the information is not available, the interface engine 310 calls or queries the adaptor 330 to find all job managers available through the adaptor 330 (step 550). The adaptor 330 returns a list of job managers available through the adaptor 330. Those skilled in the art will recognize that an adaptor 330 and a job manager 260 are capable of having a one to one relationship so that a selected adaptor must be used to communicate with the arbitrary job manager 260. Nevertheless, those skilled in the art will further recognize that an adaptor is capable of communicating with multiple job managers so long as each job manager 260 has similar methods of communication. If it is determined that no adaptor 330 is available (step 530), then the interface 350 ends the process of establishing the communication channel.

The adaptor 330 is queried for properties, functions, and information of the arbitrary job manager 260. In turn, the adaptor 330 is able to abstract the requested information and return to the interface engine 310 functions and property information for the arbitrary job manager 260. The adaptor 330 is also capable of returning a template having the appropriate values in the appropriate fields or returning one or more objects that include the appropriate source and property information for the arbitrary job manager 260. Further, the adaptor 330 is capable of updating a file or object with data specific to the arbitrary job manager 260.

To facilitate abstraction of job manager information by the adaptor 330 that concerns an arbitrary job manager 260, the interface 350 can provide a read mechanism to assist in creating the job manager object 320. In one embodiment of the present invention, the read mechanism is a file that contains property information for the arbitrary job manager 260. Such property information includes, but is not limited to a property name, property type, property constraints, help information and other like information concerning the arbitrary job manager 260 that the adaptor 330 or the interface engine 310 can read in and create a job manager object 320. Those skilled in the art will recognize that the read mechanism is not limited to property information for the arbitrary job manager 260, but can include functions and other information. In one embodiment of the present invention, the read mechanism is structured as a markup language file.

If the adaptor 330 returns one or more objects, the interface engine 310 requests the adaptor 330 to instantiate an object that includes the attributes and methods for the arbitrary job manager 260 (step 560). The adaptor 330 instantiates such an object and creates a handle to the object that is returned to the adaptor 330 for inclusion in a job manager object 320 for use by the technical computing client 250 and the interface engine 310 to communicate with the arbitrary job manager 260. For example, the interface engine 310 upon receipt of the handle from the adaptor 330 can call a constructor that creates the job manager object 320. The constructor using the provided handle can configure the proportions of the job manager object 320 to correspond to selected constructor arguments.

The job manager object 320 provides a high level representation of the communication channel 130 between the technical computing client 250 and an arbitrary job manager 260. The job manager abstraction provided by the adaptor 330 provides properties for one or more job managers 260. The job manager object 320 further provides access to configuration settings for one or more job managers 260. The job manager abstraction provided by the adaptor 330 is further capable of providing a collection of methods, for one or more job managers 260. One list of these properties and methods is described below.

| Job Manager Object Properties | |
|---|---|
| Property Name | Property Description |
| BusyWorkers | Returns a list of workers that are busy running tasks |
| HostName | Indicate name of the machine where a job queue exists |
| HostAddress | Indicate the IP address of the host machine where a job queue exists |
| FileDependencies | Return a list of user files and directories needed for task execution by the workers |
| IdleWorkers | Returns a list of workers available to run tasks |
| Jobs | Indicate the jobs contained in a job manager |
| Name | Indicate the name of the job manager |
| NumberOfBusyWorkers | Indicate number of busy workers |
| NumberOfIdleWorkers | Indicate number of workers available to run tasks |
| State | Indicate the current state of the job manager |

| Job Manager Object Functions | |
|---|---|
| Method Name | Method Description |
| createJob | Create a job object |
| findJob | Find job objects stored in a job queue |
| Pause | Pause the job manager queue |
| Resume | Resume processing of the job manager queue |

| createJob | |
|---|---|
| Purpose | Create a job in job manager |
| Syntax | obj = createJob(jobmanager)<br>obj = createJob(..., 'p1', v1, 'p2', v2, ...) |
| Arguments | obj     The job object.<br>jobmanager     The job manager object representing the job manager service that will execute the job.<br>p1, p2     Object properties configured at object creation.<br>v1, v2     Initial values for corresponding object properties. |
| Description | obj = createJob(jobmanager) creates a job object at the specified remote location. In this case, future modifications to the job object result in a remote call to the job manager. obj = createJob(..., 'p1', v1, 'p2', v2, ...) creates a job object with the specified property values. If an invalid property name or property value is specified, the object will not be created.<br>Note that the property value pairs can be in any format supported by the set function, i.e., param-value string pairs, structures, and param-value cell array pairs. |
| Example | % construct a job object.<br>jm = findResource('jobmanager');<br>obj = createJob(jm, 'Name', 'testjob');<br>% add tasks to the job.<br>for i = 1:10 |

| createJob (continued) |
|---|
| createTask(obj, 'rand', {10});<br>end<br>% run the job.<br>submit(obj);<br>% retrieve job results.<br>out = getAllOutputArguments(obj);<br>% display the random matrix.<br>disp(out{1}{1});<br>% destroy the job.<br>destroy(obj); |

In the example described above, the findResource command is important because it can be used to find any kind of job manager on the network 140. The findResource command is also able to find any kind of worker on the network 140.

| findJob | |
|---|---|
| Purpose | Find job objects stored in a job manager |
| Syntax | findJob(jm)<br>out = findJob(jm)<br>[pending queued running finished] = findJob(jm)<br>out = findJob(jm, 'p1', v1, 'p2', v2,...) |
| Arguments | jm     Job manager object in which to find the job.<br>pending     Array of jobs in job manager jm whose State is pending.<br>queued     Array of jobs in job manager jm whose State is queued.<br>running     Array of jobs in job manager jm whose State is running.<br>finished     Array of jobs in job manager jm whose State is finished.<br>out     Array of jobs found in job manager jm.<br>p1, p2     Job object properties to match.<br>v1, v2     Values for corresponding object properties. |
| Description | findJob(jm) prints a list of all of the job objects stored in the job manager jm. Job objects will be categorized by their State property and job objects in the 'queued' state will be displayed in the order in which they are queued, with the next job to execute at the top (first). out = findJob(jm) returns an array, out, of all job objects stored in the job manager jm. Jobs in the array will be ordered by State in the following order: 'pending', 'queued', 'running', 'finished'; within the 'queued' state, jobs are listed in the order in which they are queued. [pending queued running finished] = findJob(jq) returns arrays of all job objects stored in the job manager jm, by state. Jobs in the array queued will be in the order in which they are queued, with the job at queued(1) being the next to execute. out = findJob(jm, 'p1', v1, 'p2', v2,...) returns an array, out, of job objects whose property names and property values match those passed as parameter-value pairs, p1, v1, p2, v2.<br>Note that the property value pairs can be in any format supported by the get function, i.e., param-value string pairs, structures, and param-value cell arraypairs. If a structure is used, the structure field names are job object property names and the field values are the requested property values. Jobs in the queued state are returned in the same order as they appear in the job queue service. When a property value is specified, it must use the same format that the get function returns. For example, if get returns the Name property value as MyJob, then findJob will not find that object while searching for a Name property value of myjob. |

The job manager object 320 may include inputs such as a name given to an associated adaptor 330, a unique job manager 260 identifier, and other like inputs. The adaptor name input is a term used to describe the adaptor 330 that manages the communication between the arbitrary job manager 260 and the interface engine 310. The unique job manager identifier is set to an available identifier by the interface engine 310 if one is not provided. The job manager object 320 is associated with the arbitrary job manager 260 uniquely identified by the inputs of the job manager object 320.

Those skilled in the art will appreciate that within the MATLAB® environment provided by MathWorks, Inc. of Natick, Mass., a MATLAB M file is configurable such that when the M file is executed the job manager object 320 is recreated with the configurations it had when the M file was called. In this manner a user is able to capture the state of their configuration settings for later use without having to reconfigure all their settings manually. Furthermore, the execution of a file or other executable means to recreate configuration settings allows a user to readily generate a function that recreates a pre-configured object suitable to their needs. The generated function can then be integrated into an application. Nevertheless, those skilled in the art will appreciate that other executable files are creatable in other software environments to recreate a job manager object with configuration settings when the executable file is called.

The interface 350 establishes the communication channel 130 between technical computing client 250 and the arbitrary job manager 260 (step 570). That is, the technical computing client 250 calls the interface engine 310. In turn, the interface engine 310 calls the adaptor 330. The adaptor 330 communicates with the arbitrary job manager 260, and establishes a connection or communication channel 130 between the technical computing client 250 and the arbitrary job manager 260. Those skilled in the art will recognize that depending on the arbitrary job manager 260 and the capabilities of the arbitrary job manager 260, the interface 350 can offer multiple threads or multiple communication channels between the technical computing client 250 and the arbitrary job manager 260 or between the technical computing client 250 and multiple arbitrary job managers.

Figure 6:
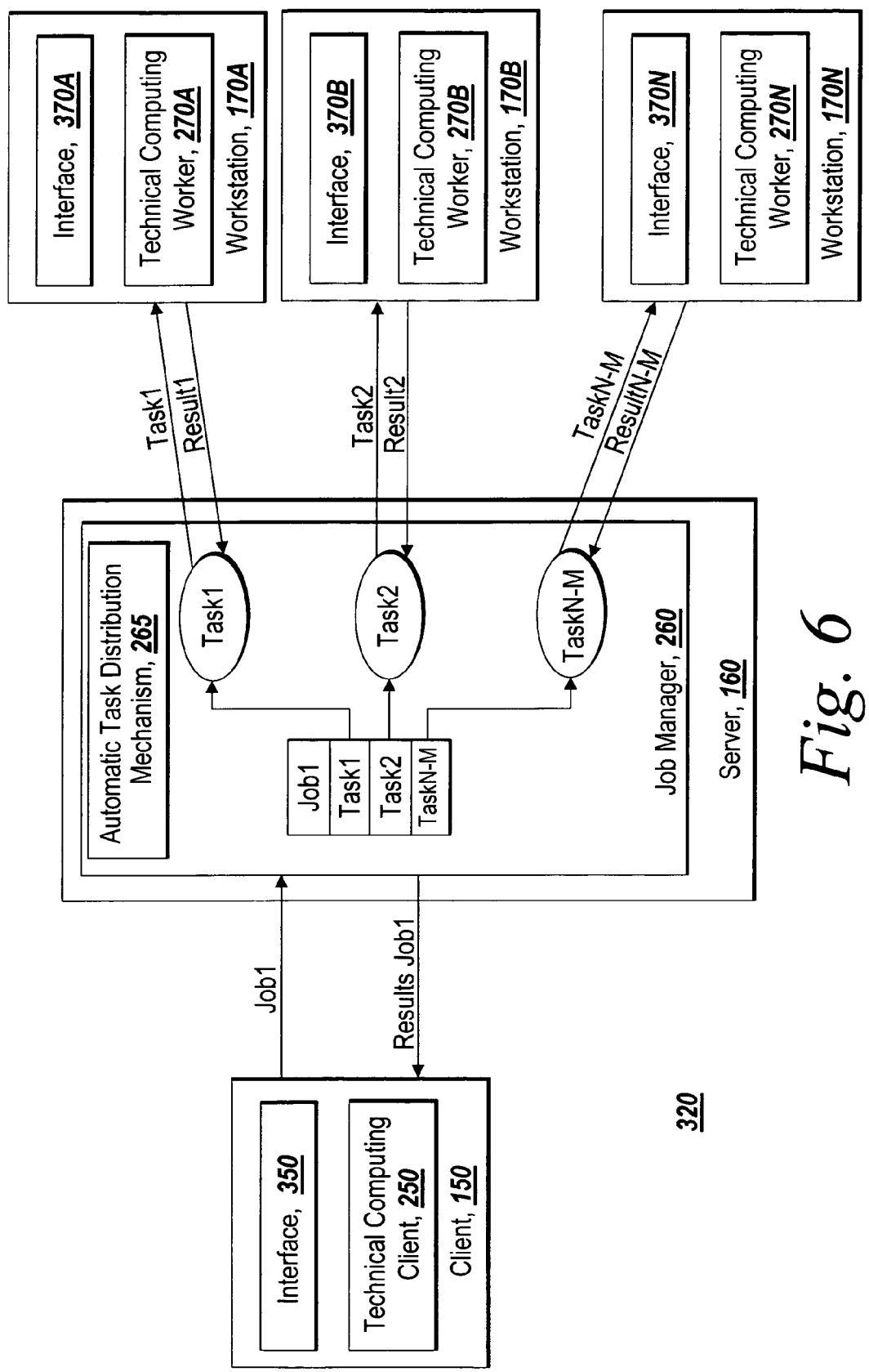
FIG. 6 is a block diagram of an exemplary distribution system showing an illustrative distribution operation mode.

FIG. 6 is a block diagram of an exemplary distribution system showing an illustrative distribution operation mode. The technical computing client 250 is in communication with the arbitrary job manager 260 on the server 160 using the interface 350. The arbitrary job manager 260 may include a task distribution mechanism 265 running as part of the arbitrary job manager 260 on the server 160. The arbitrary job manager 260 may further include a queue for arranging and handling submitted jobs. The technical computing workers 270A-270N are in communication with the arbitrary job manager 260 using the interfaces 370A-370N to receive tasks from the automatic task distribution mechanism 265 of the arbitrary job manager 260.

The technical computing client 250 defines the job including related tasks. The technical computing client 250 submits the job containing the related tasks to the arbitrary job manager 260 via the interface 350. The arbitrary job manager 260 obtains the tasks from the job and submits the tasks, via an automatic task distribution mechanism 265, to the technical computing workers 270A-270N to perform technical computing. For example, technical computing client 250 defines a job, Job1, with a set of three tasks: Task1, Task2 and TaskN-M. The technical computing client 250 then submits Job1 to the arbitrary job manager 260 via the interface 350. The arbitrary job manager 260 obtains Job1 and obtains each of the tasks, Task1-TaskN-M, from Job 1. Then, the automatic task distribution mechanism 265 of the arbitrary job manager 260 submits each of the tasks to a technical computing worker 270A-270N for technical computing. For example, the arbitrary job manager 260 may submit Task 1 to technical computing worker 270A via the interface 370A to compute and produce a Result1 for Task1. Technical computing worker 270A provides the Result1 to the arbitrary job manager 260 via the interface 370A. In a similar fashion, the arbitrary job manager 260 may submit Task2 and TaskN-M to technical computing worker 270B and technical computing worker 270N with each technical computing worker 270B and 270N providing the results for Task2 and TaskN-M respectively to the arbitrary job manager 260 via the interfaces 370B and 370 N. When all the results from each of the tasks of Job1 are received, the arbitrary job manager 260 then provides the results of each of the tasks of Job 1 to the technical computing client 250 via the interface 350.

One of skill in the art will appreciate that the distribution operation mode described above is illustrative and not limiting the scope of the present invention. Rather, another embodiment of the present invention may implement different modes of task distribution, such as a direct distribution mode and an automatic distribution mode, which are described in more detail in pending U.S. patent application Ser. No. 10/896,784 entitled "METHODS AND SYSTEM FOR DISTRIBUTING TECHNICAL COMPUTING TASKS TO TECHNICAL COMPUTING WORKERS," which is incorporated herewith by reference.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. A system for interfacing with an arbitrary job manager, the system comprising:
   a client for creating tasks;
   one or more job managers for receiving tasks from the client; and
   a first interface for establishing a first communication channel between the client and the job manager so that the client submits the tasks to the job manager through the first communication channel using abstracted information that is specific to the job manager,
   wherein the first interface comprises an adaptor for abstracting information on the job manager.

2. The system of claim 1, further comprising:
   one or more workers for receiving the tasks distributed from the job manager; and
   a second interface for establishing a second communication channel between the worker and the job manager so that the job manager distributes the tasks to the worker through the communication channel using abstracted information that is specific to the job manager.

3. The system of claim 1, wherein the first interface comprises:
   an interface engine for controlling data transfer between the client and the job manager.

4. The system of claim 1, wherein the adaptor abstracts information on one or more job managers.

5. The system of claim 1, wherein the first interface comprises:
   a job manager object created based on the information abstracted by the adaptor.

6. The system of claim 2, wherein the one or more workers execute the tasks and return results of executing the tasks to the job manager through the second communication channels.

7. The system of claim 6, wherein the job manager forwards the results to the client through the first communication channel.

8. The system of claim 1, further comprising:
a communication network between the client and the job manager.

9. In an electronic device for a client, a method for interfacing with a job manager, the method comprising the steps of:
defining tasks in the client;
establishing a communication channel between the client and the job manager using abstracted information on the job manager by searching the client for an adaptor for the job manager, wherein the adaptor abstracts information concerning the job manager; and
submitting the tasks to the job manager through the communication channel.

10. The method of claim 9, further comprising the step of:
receiving results of the tasks to the client through the communication channel.

11. The method of claim 9, wherein the adaptor abstracts information on one or more job managers.

12. The method of claim 9, wherein the step of establishing comprises the step of:
instantiating an object for the job manager based on the information abstracted by the adaptor.

13. In an electronic device for a worker of a system, a method for interfacing with a job manager, the method comprising the steps of:
establishing a communication channel between the job manager and a remote worker using abstracted information on the job manager by searching for an adaptor for the job manager, wherein the adaptor abstracts information concerning the job manager; and
receiving one or more tasks from the job manager through the communication channel.

14. The method of claim 13, further comprising the step of:
executing the one or more tasks in the remote worker; and
returning results of executing the one or more tasks to the job manager through the communication channel.

15. The method of claim 13, wherein the adaptor abstracts information on one or more job managers.

16. The method of claim 13, wherein the step of establishing comprises the step of:
instantiating an object for the job manager based on the information abstracted by the adaptor.

17. A computer program product holding instructions executable in a computational device, comprising:
defining tasks in the client;
establishing a communication channel between the client and the job manager using abstracted information on the job manager by searching the client for an adaptor for the job manager, wherein the adaptor abstracts information concerning the job manager; and
submitting the tasks to the job manager through the communication channel.

18. The computer program product of claim 17, further comprising the step of:
receiving results of the tasks to the client through the communication channel.

19. The computer program product of claim 17, wherein the adaptor abstracts information on one or more job managers.

20. The computer program product of claim 17, wherein the step of establishing comprises the step of:
instantiating an object for the job manager based on the information abstracted by the adaptor.

21. A computer program product holding instructions executable in a computational device, comprising:
establishing a communication channel between the job manager and a remote worker using abstracted information on the job manager by searching for an adaptor for the job manager, wherein the adaptor abstracts information concerning the job manager; and
receiving one or more tasks from the job manager through the communication channel.

22. The computer program product of claim 21, further comprising the step of:
executing the one or more tasks in the remote worker; and
returning results of executing the one or more tasks to the job manager through the communication channel.

23. The computer program product of claim 21, wherein the adaptor abstracts information on one or more job managers.

24. The computer program product of claim 21, wherein the step of establishing comprises the step of:
instantiating an object for the job manager based on the information abstracted by the adaptor.

* * * * *